Sept. 30, 1941.     O. E. CRITES     2,257,159
ELECTRICAL COOKING DEVICE
Filed April 27, 1939     3 Sheets-Sheet 3
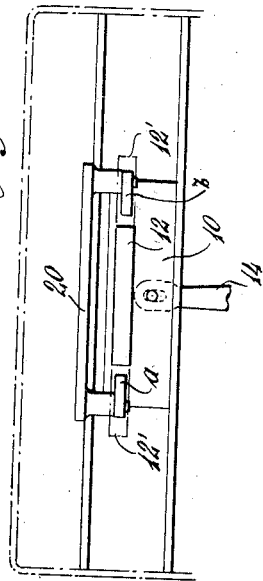
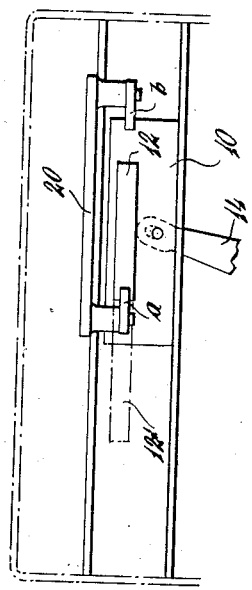
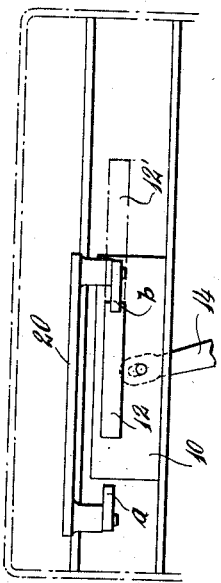
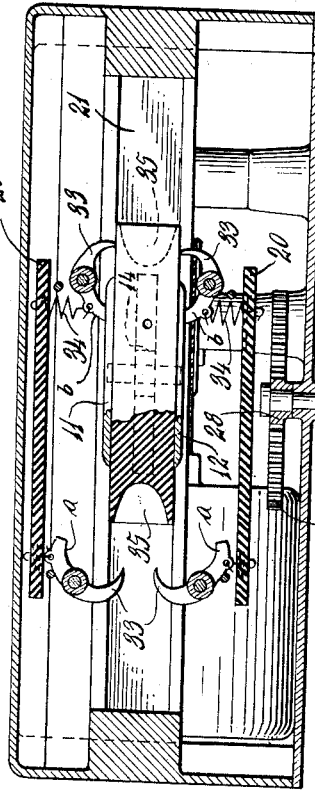
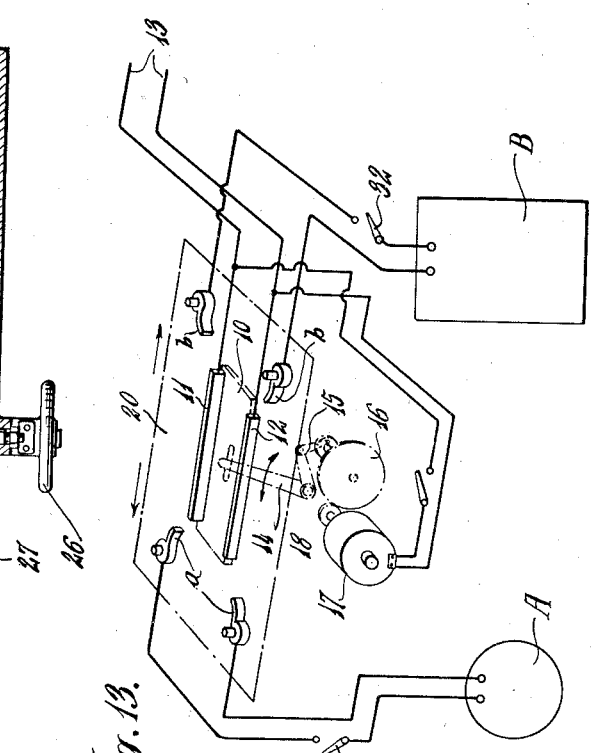
INVENTOR
Orr E. Crites
BY
ATTORNEY Patented Sept. 30, 1941

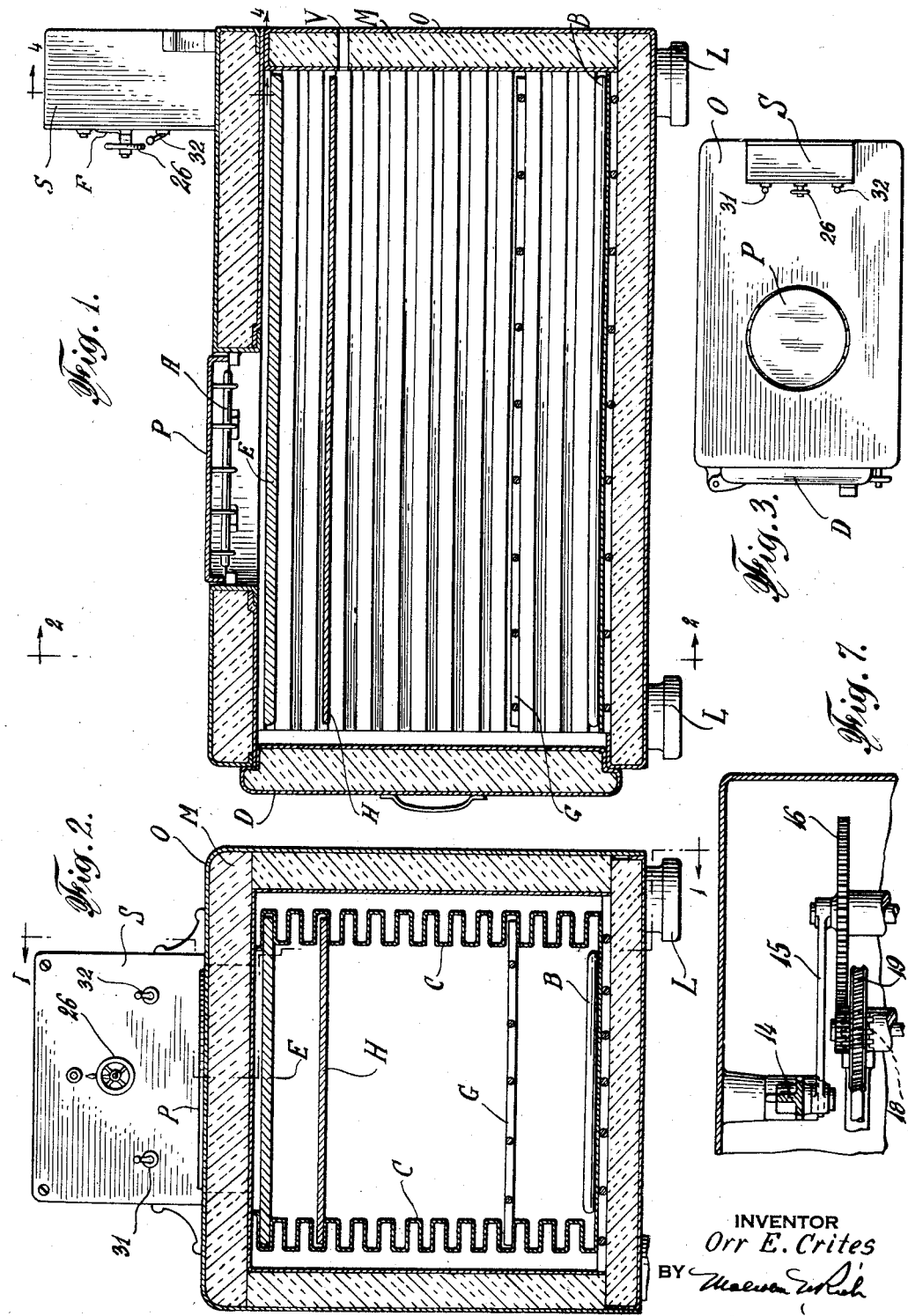

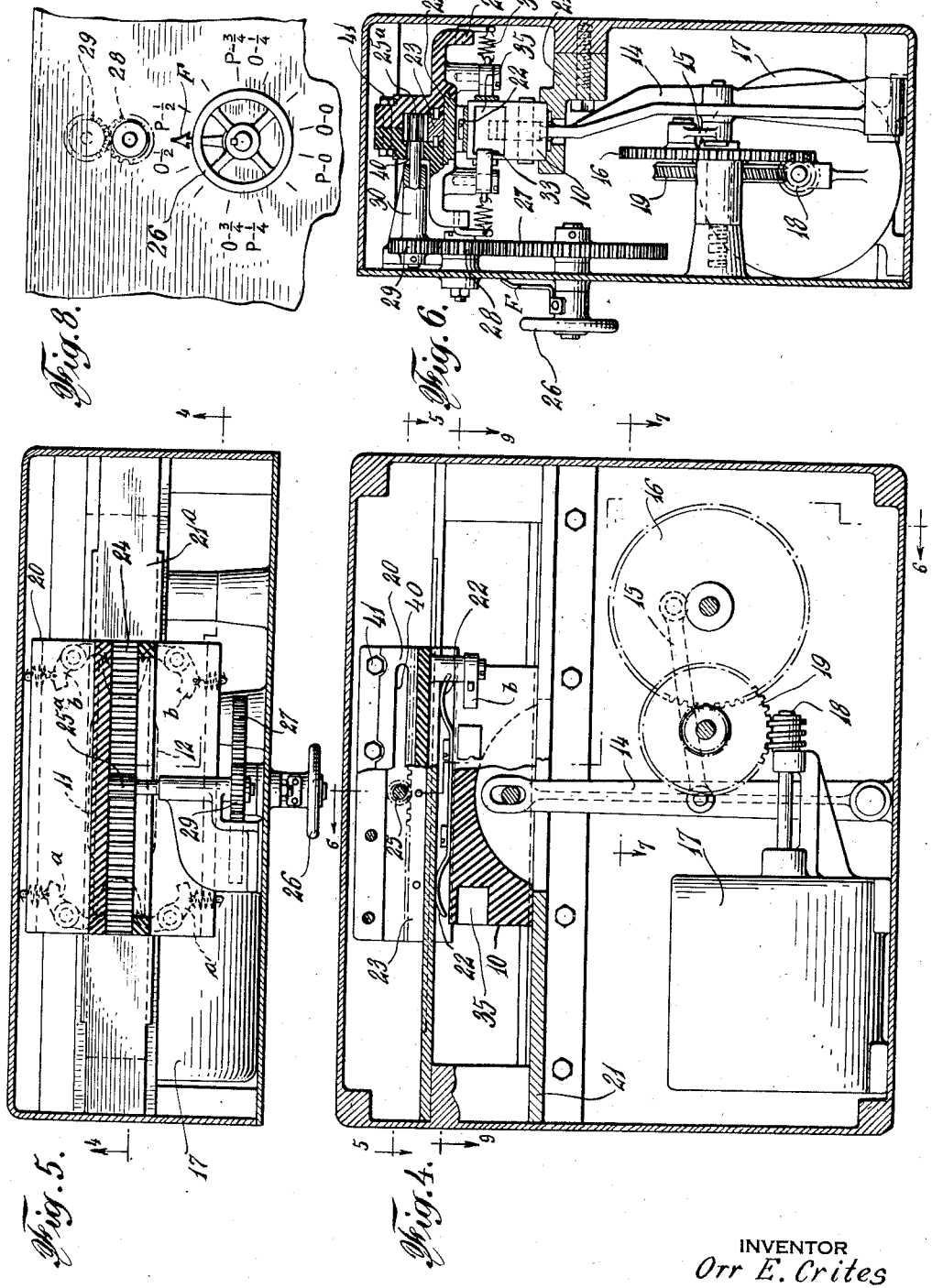

2,257,159

UNITED STATES PATENT OFFICE 2,257,159

ELECTRICAL COOKING DEVICE

Orr E. Crites, Short Hills, N. J.

Application April 27, 1939, Serial No. 270,284

5 Claims. (Cl. 219—35)

This invention relates to electrical cooking devices and more particularly to an electric range adapted to perform singly or concurrently the operations of surface cooking and oven cooking on a maximum current demand of not over 15 amperes.

One of the objects of the present invention is to provide an electric range adapted to supply complete cooking capacity for an average family, which is operable from the ordinary wall or base outlet opening of the usual house wiring circuits. Another object is to provide an electric range having a maximum current demand of about 15 amperes which is capable of performing surface cooking, such as boiling, toasting, steaming or frying and oven cooking such as baking, broiling or roasting, separately or simultaneously. Still another object is to provide a small portable electric range operable from any usual house wiring circuit adapted to perform any of the essential cooking operations needed by a family of average size. Other objects and advantages will be apparent as the invention hereinafter is disclosed.

In accordance with the above objects I have devised the electric range illustrated in the accompanying drawings of which the following is a full and complete description:

In the drawings, Fig. 1 is a sectional view along plane 1—1 of Fig. 2 of the electric range of the present invention; Fig. 2 is a sectional view along plane 2—2 of Fig. 1; Fig. 3 is a top plan view of the same; Fig. 4 is a sectional view along plane 4—4 of Fig. 1; Fig. 5 is a sectional view along plane 5—5 of Fig. 4; Fig. 6 is a sectional view along plane 6—6 of Fig. 4; Fig. 7 is a sectional view along plane 7—7 of Fig. 4; Fig. 8 is an enlarged front section partly cut away; Fig. 9 is a sectional view along plane 9—9 of Fig. 4; Figs. 10, 11 and 12 illustrate schematically three positions of a current directional switch feature of the present invention; and Fig. 13 is a schematic diagram illustrating the operation of the directional switch means and the electrical wiring diagram of the present invention.

Referring to the drawings, the present invention comprises an electric range consisting of a heat insulated oven O having a high intensity electrical heating-element A disposed in the top and a low intensity heating-element B disposed in the bottom thereof, each said heating-element being of a size, shape and configuration heretofore common in the art and designed electrically to draw not over 15 amperes from a 110 volt alternating current supply source. The top heating-element A is provided with a cover plate element P as is also customary in the art and is disposed in an opening in the top wall of the oven in such manner as to bring the plate element P substantially flush with the upper surface of the top wall to provide for surface cooking on the top of the range and to provide for broiling within the oven below the said element A.

The bottom heating-element B is disposed in relatively close thermal contact with the oven lining to provide even and uniform distribution of the heat energy emitted by the element within the oven chamber for baking and roasting, as is also customary in the art.

Oven O is provided with the usual hinged door D and preferably stands on legs L—L to provide an air space between the bottom of the oven O and the table or other support provided therefor. Interiorly the oven O is provided with the usual side corrugated members C—C to permit adjustment of support gratings G at different horizontal levels therein and heat insulating baffle member H may be provided to vary the cubical contents of the oven area being heated by heating-element B, if desired. Baffle plate E also is provided to seal off heating-element A from the oven interior, if desired, particularly when surface cooking operations only are desired. The exterior walls of the oven O are insulated against heat loss by heat insulating material M substantially as indicated and a vent opening V is provided therein for ventilation and to maintain atmospheric pressure therein.

The cubical size of oven O and its specific dimensions may be widely varied without departure from the present invention, however, the size offering the widest adaptability appears to be that providing an interior dimension approximating 12 by 12 by 20 inches. Plate P and the heating coil A associated therewith is preferably circular, substantially as shown and of a diameter approximating 8½ inches, although this also may be widely varied as may the type and kind of heating element A employed without essential departure from the present invention. Heating-element B preferably rectangular in shape approximating the inner bottom dimension of the oven O, substantially as indicated, to obtain as wide and as general dispersion of the heat energy of the element B within the oven as is practical without the use of baffles therein.

In combination with the heating-elements A and B I provide means to energize the said elements A and B alternately at a determined timed frequency and means to vary the time interval of energization of said elements from zero percent to 100% reciprocally. The means to energize elements A and B alternately and at reciprocal proportions of a determined time interval is illustrated in the drawings as comprising an adjustable and automatically operating directional switch means S which operates to direct the electric current at timed intervals or at fractions of said timed intervals alternately from the supply source through one or the other of the heating-elements A and B.

The safe current carrying capacity of ordinary house wiring circuits approximates 15 amperes at 110 volts and heating-elements A and B each having a wattage of approximately 1500 watts therefore cannot be simultaneously connected into the same supply circuit or into the same wall or base outlet of the circuit without overloading the circuit. I therefore provide the automatically operating switch means S to direct the electric current drawn from any service outlet opening of the house circuit alternately first to one and then to the other said heating-elements A and B at and for determined time intervals, the frequency of alternation being selected with respect to the heating capacity of the said elements A and B so that where the current is applied alternately for equal time intervals the two said elements are maintained at a substantially constant operating temperature, and further provide means to vary this alternation of the current application to the said elements A and B so that within the determined time interval of alternation of current, the current may be applied through the entire time interval on either element or for any desired fraction of the time interval onto one element with the remaining fraction of the time interval on the other element.

Referring to Figs. 4–12 inclusive, the construction and operation of the switch means S may be noted. The switch means S comprises an oscillating member 10 carrying parallel spaced bus bars 11 and 12 which are electrically connected by any convenient means to the electric current supply source 13 as indicated in Fig. 13, is oscillated or reciprocated through a determined path, preferably horizontal, by means of lever 14 pivoted at its bottom end and actuated by crank arm 15 connected to rotating crank disc 16 driven by motor 17 through suitable reduction gearing 18—19. Motor 17 is electrically connected to supply source 13 as indicated in Fig. 13.

Along the path of horizontal movement of member 10 is provided two sets of parallel spaced electrical contacts a—a and b—b in determined spaced relation to each other, the spacing between the pairs of contacts being greater than the over all lengths of bars 11—12 on member 10. Contacts a—a and b—b are each located in a position relative to the path of travel of bars 11—12 which permits electrical contact or engagement of the contacts a—a or b—b with the bars 11—12 during oscillation of the member 10. Contacts a—a are electrically connected to heating-element A and contacts b—b are electrically connected to heating-element B.

Contacts a—a and b—b are fixedly located on a movable member 20 adjustable horizontally in the direction of oscillation of member 10 so that in one position of member 20 bars 11—12 will be in contact with contacts a—a during the entire oscillation movement of member 10 and in a reverse position contacts b—b will be in contact with bars 11—12 during the entire oscillation movement of member 10, and at any intermediate position bars 11—12 will be in contact during a portion of the oscillation movement with one set of contacts a—a and during the remaining portion in contact with the other set of contacts b—b.

With this arrangement of oscillating member 10 and adjustable contact carrying member 20 and with any given periodicity of oscillation of member 10, the electric current from source 13 can be applied wholly on one heating-element A, or wholly on the other element B or for any desired fraction of the time first on one element A or B and then on the other element B or A.

There are many ways in which this particular alternation of energizing current to one or the other of heating-elements A or B may be applied mechanically. The arrangement illustrated in Figs. 4–9 inclusive appears most practical for the purpose of illustration. In this arrangement, oscillating member 10 is a rectangular shaped block comprised of insulating material and bus bars 11 and 12 carrying the energizing current are secured onto the sides of the block. The member or block 10 is supported horizontally by support means 21 and rides in a grooved recess therein to define a determined path of travel for the member 10, the length of the path being regulated by oscillating lever 14.

Adjustable member 20 carrying spaced contacts a—a and b—b is preferably slidably mounted on an overhead support member 21a disposed in a horizontal plane relative to horizontal support 21 to provide for the engagement of spring means 22—22 on the upper part of member 10 with the under side of support member 21a to restrain oscillating member 10 against vertical displacement during oscillation.

In effect adjustable member 20 is a U-shaped carriage slidably engaging support member 21a in an interlocking joint substantially as shown restraining the member 20 from movement in all directions except a reciprocating sliding movement therealong. As shown the member 20 is formed in two sections to provide for ready assembly on support 21a. The two sections being joined together by bolts 41 about a central bar 23 carrying on its upper surface a track gear 24. One side wall of member 20 is provided with a rectangular opening 40 permitting the insertion of extension shaft 25 carrying gear 25a on the end thereof to bring gear 25a into engagement with track gear 24, and forward and reverse movement of member 20 is obtained by rotation of gear 25a through rotation of wheel 26 operating through suitable reversing gears 27, 28 and 29 on shaft 30 carrying extension shaft 25 on which gear 25a is mounted. The gearing arrangement between wheel 26 and gear 25a, meshing with track 24, is provided with sufficient friction to prevent member 20 from displacement except by rotation of wheel 26.

The relative position of member 20 with respect to oscillating member 10 with consequent proportionate distribution of the electric current between the heating-elements A and B, may be varied widely by rotating gear 25a thereby moving member 20 along support 21a from one extreme position to another and can be visually indicated by a dial such as indicated in Fig. 8, wherein P stands for plate or top heating-element A and O stands for the bottom or oven heating-element B, and the position of pointer F on the scale indicates the position of the contacts a—a and b—b relative to the oscillating member 10.

From the above description and the drawings one skilled in the art will perceive that by the directional switch means shown, the electric current from source 13 carried by bars 11 and 12 may be passed as indicated in Fig. 10 to plate element A or to oven element B alternately during substantially equal time intervals regulated by the fixed periodicity of oscillation of member 10; and that by adjusting the member 20 along the oscillating path of member 10 contacts a—a and b—b may be moved to one extreme position (as indicated in Fig. 11) wherein during all positions of oscillation the current carried by bars 11—12 on member 10 is on one pair of contacts a—a during the entire oscillating movement or to another extreme position (as shown in Fig. 12) wherein the current carried by bars 11—12 on member 10 is on the other pair of contacts b—b during the entire oscillating movement. At positions intermediate to these extreme positions the current carried by bars 11—12 on member 10 is proportionately distributed between the two sets of contacts a—a and b—b, as for example, in Fig. 10, the current is applied during substantially equal time intervals first on one pair of contacts and then on the other pair of contacts. Assuming a position of member 20 which is half way between the positions indicated in Figs. 10 and 11 or 10 and 12 the contacts a—a and b—b would receive the current for ¾ and ¼ or ¼ and ¾ the time interval, respectively.

When the contacts a—a or b—b are shifted to the extreme positions shown in Figs. 11 and 12, heating-elements A and B are respectively heated to maximum temperatures. Where it is desired to operate either of the elements A or B at lower temperatures separately without operating the other, the member 20 may be shifted to an intermediate position wherein the time interval of current application during the oscillation of member 10 is sufficient to obtain the lower operating temperature and then open one or the other of switch means 31—32 to prevent energizing the plate or oven heating-element not being used.

To provide against detrimental arcing during the making and breaking of contacts a—a and b—b with bars 11—12 incident to the oscillation of member 10, I preferably provide means to make and break the circuit positively. To obtain this I have pivotally mounted contacts a—a and b—b on member 20, substantially as indicated in Fig. 9, and contacts a—a and b—b are arranged to be brought simultaneously into engagement with the bars 11—12 as the member 10 moves into a position engaging a lever arm 33 on each contact a—a or b—b operating to pivot each contact a (or b) about its pivotal axis against the action of spring tension means 34. Spring tension means 34 operates to positively and quickly pull the contact a (or b) from engagement with the bar 11 (or 12) as the lever arm 33 falls into hollowed end section 35 of member 10.

The electric range of the present invention including the two heating-elements A and B and directional switch means S is adapted for direct connection to the ordinary 110 volt alternating electric current circuit common to house wiring without the necessity of providing a special wiring circuit therefor from the main switch and is arranged to provide sufficient wattage for the performing of all essential cooking operations of boiling, frying, broiling, toasting, baking and roasting, separately or simultaneously, necessary in the preparation of meals for a family of average size.

In the ordinary operation of the range, the element A, for example, may be energized to its maximum temperature for a time interval necessary to bring a kettle or pan to the cooking temperature desired and then by shifting member 20 to another position just the sufficient amount of heat energy may be supplied to the element A to maintain this cooking temperature while the remaining energy may be applied to element B to heat oven O to a desired baking or roasting temperature or the sequence may be reversed, if desired.

It is believed apparent from the above description of the present invention and from the drawings that many modifications and adaptations of the present invention may be made without essential departure therefrom and all such are contemplated as may fall within the scope of the following claims.

What I claim is:

1. In electric cooking apparatus provided with two heating elements and means for alternately energizing said elements for determined time intervals, means to vary the time of energization of either said heating elements within each said determined time interval from 100% thereof to zero percent thereof with substantially all of the reciprocal portion remaining of said time interval directed automatically to the other said element.

2. A cooking apparatus comprising a thermally insulated oven, a heating element for said oven, a top surface heating element in the top of said oven, and a switch means to direct electric current from a supply circuit to the two said heating elements alternately for determined time intervals, and means to vary the time of energization of either said heating elements within said determined time interval from 100% thereof to zero percent thereof with substantially all of the reciprocal portion remaining of said time interval being directed automatically to the other said element.

3. The combination of claim 2, wherein said switch means and said means to vary the said time interval comprises an oscillatable member carrying parallel spaced bus bars electrically connected to opposite poles of an electric current supply circuit, means to oscillate said member along a determined path, two pairs of electrical contacts movably sustained in determined parallel spaced relation on opposite sides of said member and along the path of oscillation thereof in a position to contact with said bus bars the spaced relation therebetween being greater than the length of said bus bars and one said pair of contacts being electrically connected to pass the electric current carried by said bus bars to one said load circuit and the other being similarly electrically connected to the other said load circuit, and means to adjust the two said pairs of contacts simultaneously from a position relative to the path of travel of said bus bars wherein the said bus bars are in contact with one said pair of contacts throughout the entire oscillation period to a position wherein the said bus bars are in contact with the other said pair of contacts throughout the entire oscillation period and to any position intermediate the two said positions wherein the two pairs of contacts are in contact with said bus bars for alternate reciprocal portions of the said oscillation period.

4. The apparatus of claim 2, said switch means and said means to vary the same comprising a moving member repeatedly traversing a determined path, said element carrying contacts electrically connected to the source of electric energy for said heating-elements and a shiftable member carrying two sets of electrical contacts one set being electrically connected to one of said heating-elements and the other set being electrically connected to the other of said heating-elements, and means to sustain said shiftable member in a position relative to the path of travel of said moving member to locate either or both said contacts along the path of travel of said member in a position to contact therewith during the entire movement or for reciprocally determined portions of the movement.

5. The apparatus of claim 2, said switch means and said means to vary the same comprising a horizontally sustained member provided with parallel spaced bus bars, means electrically connecting said bus bars to a source of energizing electric current for said heating-elements, means to reciprocate said member along a determined path of horizontal travel in said support means, a second member horizontally sustained adjacent the path of travel of said first member, two pair of spaced contacts carried by said second member each contact of each said pair of contacts being disposed on said member in a position relative to the path of travel of said bus bars to contact therewith and the horizontal spacing between said pair of contacts being greater than the length of said bus bars, means electrically connecting one pair of said contacts to one said heating-element and the opposite pair to the other said heating-element, and means to locate said second member at one of a plurality of positions along the horizontal path of travel of said first member thereby to in one position bring one pair of contacts continuously into engagement with said bus bars during the entire oscillation of said first member, in an opposite position the other pair of contacts similarly in contact with said bus bars and at intermediate positions for reciprocal portions of the time period of said oscillation of said first member.

ORR E. CRITES.